Jan. 14, 1964 F. V. BISTROM 3,117,804
TRACTOR TRUCK HAVING BODY DESIGNED FOR USE
EITHER AS FIFTH-WHEEL MOUNT OR FLAT BED
Filed May 3, 1961 4 Sheets-Sheet 1

INVENTOR.
F. V. BISTROM
BY
ATTORNEYS

INVENTOR.
F. V. BISTROM
BY
ATTORNEYS

Jan. 14, 1964        F. V. BISTROM        3,117,804
      TRACTOR TRUCK HAVING BODY DESIGNED FOR USE
          EITHER AS FIFTH-WHEEL MOUNT OR FLAT BED
Filed May 3, 1961                              4 Sheets-Sheet 4

INVENTOR.
F. V. BISTROM
BY
Parmer & Seed
ATTORNEYS

United States Patent Office 3,117,804
Patented Jan. 14, 1964

3,117,804
TRACTOR TRUCK HAVING BODY DESIGNED FOR USE EITHER AS FIFTH-WHEEL MOUNT OR FLAT BED
Frank Vernon Bistrom, Seattle, Wash., assignor to Pacific Car and Foundry Company, Seattle, Wash., a corporation of Washington
Filed May 3, 1961, Ser. No. 107,543
12 Claims. (Cl. 280—438)

This invention relates to a multi-duty vehicle body, particularly a body which permits the vehicle to function either (1) as the tractor unit for a truck-and-trailer combine, or (2) as a flat-bed truck. While there are numerous industrial applications to which a vehicle of this nature lends itself, one area of particular usefulness is in the oilfields.

The invention has for its general object the provision of a vehicle the body of which is so constructed that it lends itself to performance of each of the above-described functions with little reduction in efficiency as compared to that which would be expected from vehicles engineered expressly for the single use either as a tractor or a flat bed truck.

More particular objects and advantages of the invention will, with the foregoing, appear and be understood in the course of the following description and claims, the invention consisting in the novel construction and in the adaptation and combination of parts hereinafter described and claimed.

In the accompanying drawings:

FIG. 8 is a fragmentary transverse vertical sectional view on line 8—8 of FIG. 5.

Figure 1:
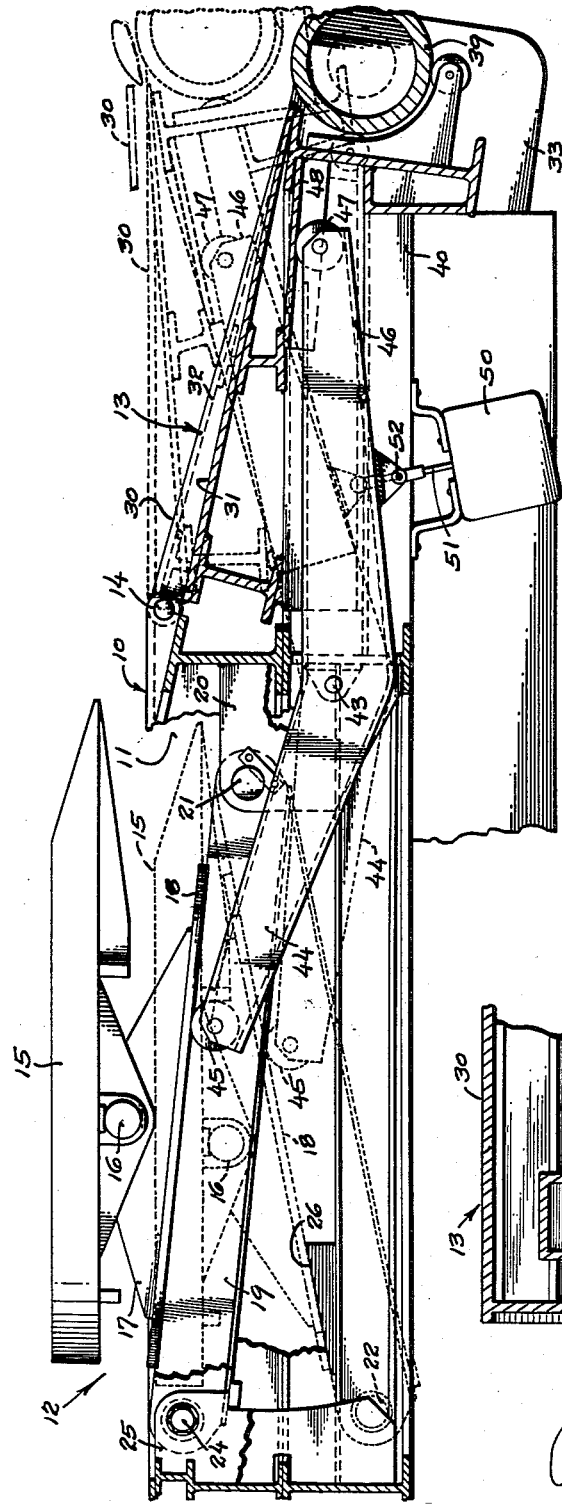
FIGURE 1 is a fragmentary longitudinal vertical sectional view illustrating a vehicle body constructed in accordance with preferred teachings of the present invention. The section line is shown at 1—1 of FIG. 2.
Figure 2:
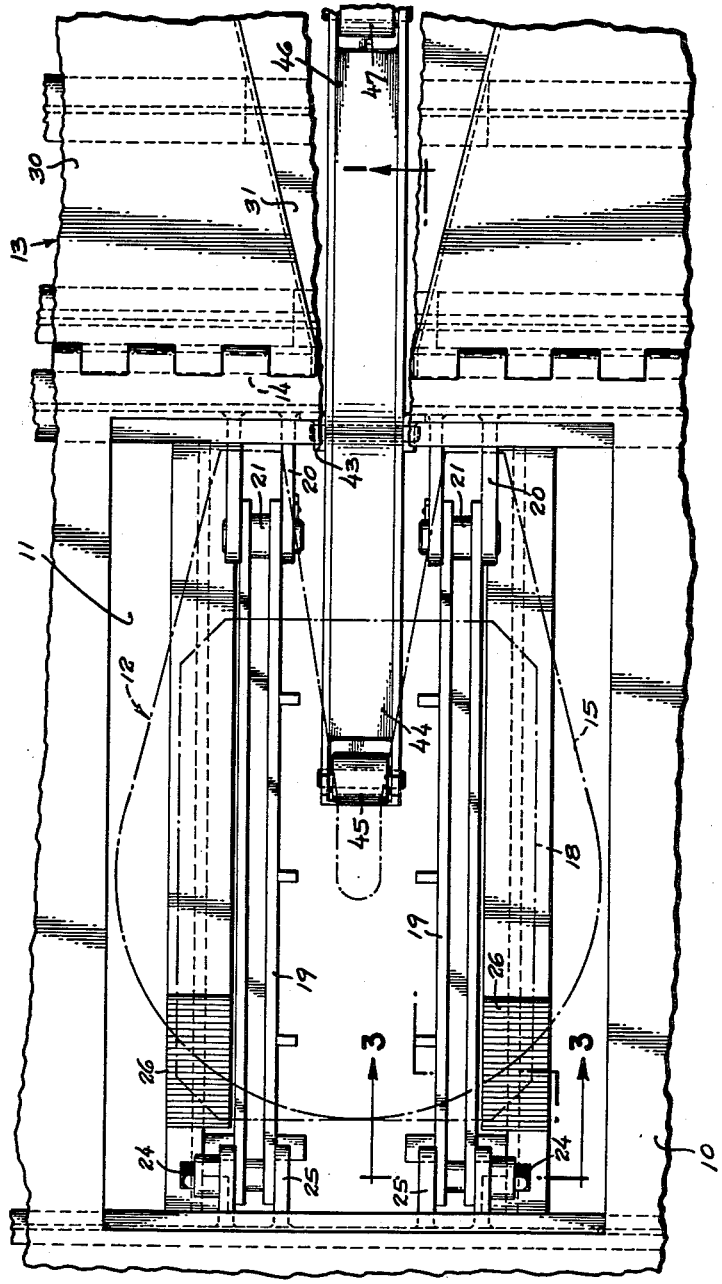
FIG. 2 is a fragmentary top plan view thereof, with the fifth wheel shown in phantom in order to permit a full-line illustration of underlying frame structure.
Figure 3:
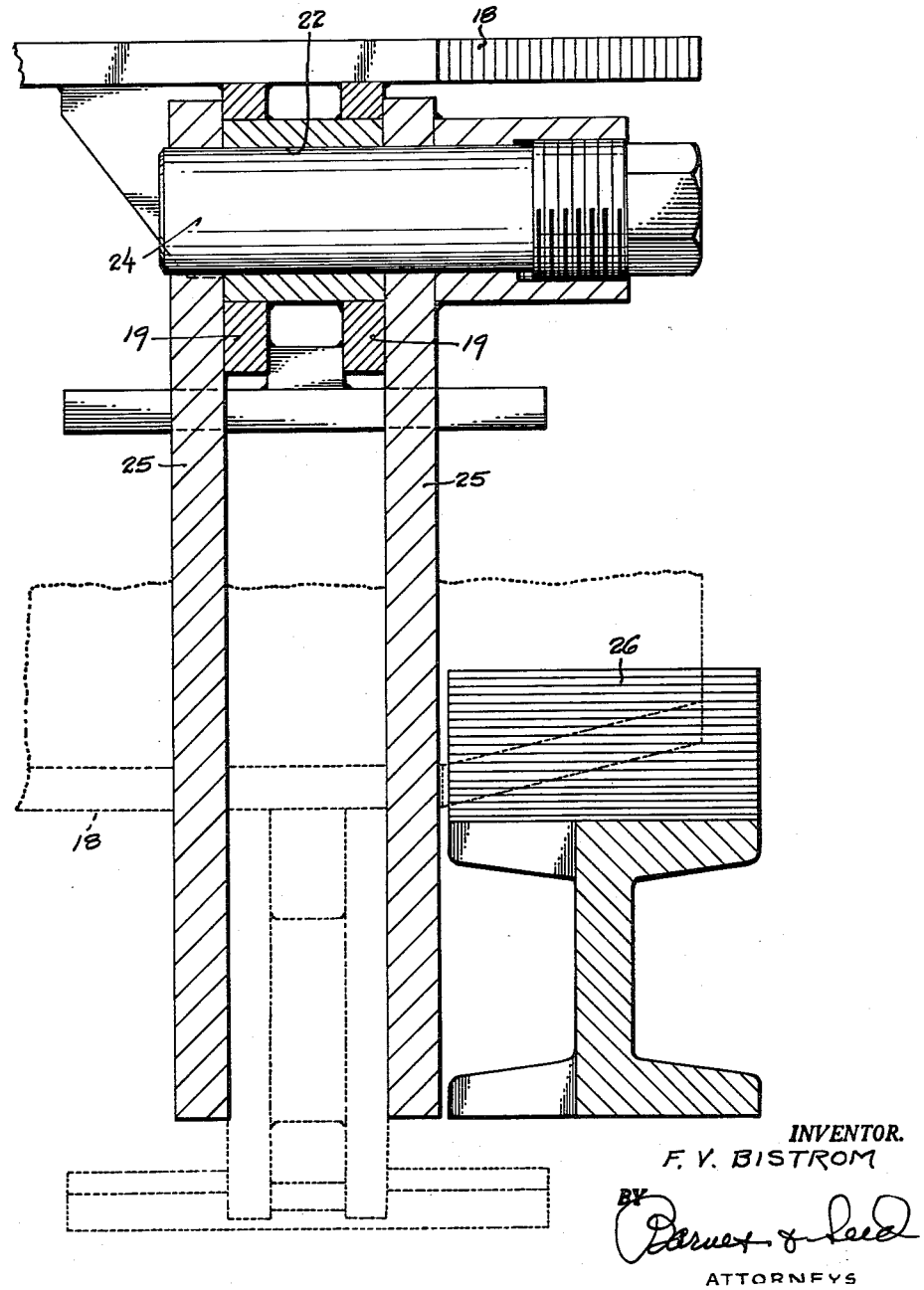
FIG. 3 is a fragmentary transverse vertical sectional view drawn to an enlarged scale on line 3—3 of FIG. 2.

Referring to said drawings, the numeral 10 designates the top deck of a flat bed body having a well 11 for the accommodation of a retractable fifth wheel 12. This well is centered as respects the width of the body and is located immediately to the front of a tail ramp 13. The ramp is pivoted, as at 14, so as to swing vertically about a transverse horizontal axis. The manner in which the body and its said tail ramp are fabricated is unimportant and reference will be here made only to such structural pieces as are important to an understanding of the correlation of parts.

The platform 15 of said fifth wheel surmounts a swing-frame, being pivoted, as at 16, to ribs 17 of the latter for rocker motion, when occupying its elevated position, about a transverse horizontal axis. The ribs rise from a horizontal plate 18 which is supported in turn by paralleling longitudinal stringers 19 located at opposite sides of the longitudinal median line of the fifth wheel. The rear ends of these stringers are received between the arms 20 of a respective forked mounting bracket welded or otherwise made integral with the vehicle main frame, being pivoted by co-axial pins 21 to said brackets so as to swing vertically about a transverse horizontal axis.

The opposite or front ends of said stringers have through-holes 22 drilled transversely on a coinciding horizontal axis, and when the swing-frame is elevated so that the fifth wheel occupies said operating position in which it is shown by full lines in FIG. 1 these holes receive locking pins 24 passed through registering holes drilled through pairs of spaced lugs 25 integral with the frame of the flat-bed body. Such pairs of lugs guide the stringers in the swing motion of the latter between said elevated position and a lowered position. The swing frame is localized when in such lowered position by having said side edges of the plate 18 brought to bear upon pillow rests 26. The fifth-wheel 12, in said lowered position of the swing-frame, lies flush with the top deck 10 of the flat bed.

The tail ramp presents an upper deck 30 which is uninterrupted except for a centrally placed depressed trough 31 the converging side walls 32 of which provide a lead-in throat for guiding a trailer-carried king pin (not shown) into the mating socket of said fifth wheel 12. Said deck is suitably reinforced by underlying cross members of a ramp frame, and along each of its side edges presents a hanging skirt 33. Immediately to the outside of these skirts there is provided a respective main-frame extension 34.

Figure 4:
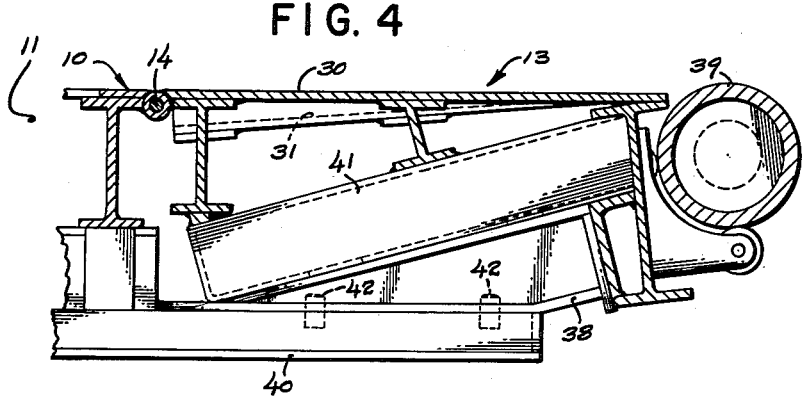
FIG. 4 is a fragmentary longitudinal vertical sectional view of the vehicle's rear end, the scale being the same as that of FIGS. 1 and 2, and with the section line spaced inwardly immediately adjacent the near side of the vehicle.
Figure 5:
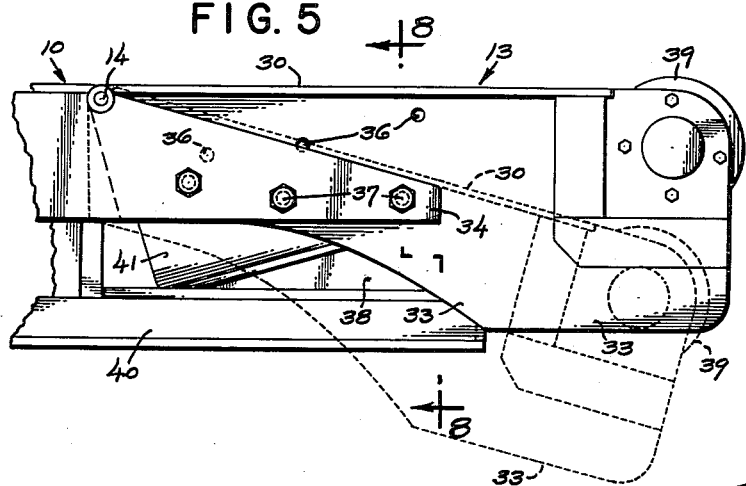
FIG. 5 is a fragmentary side elevational view of said rear end of the vehicle.
Figure 6:
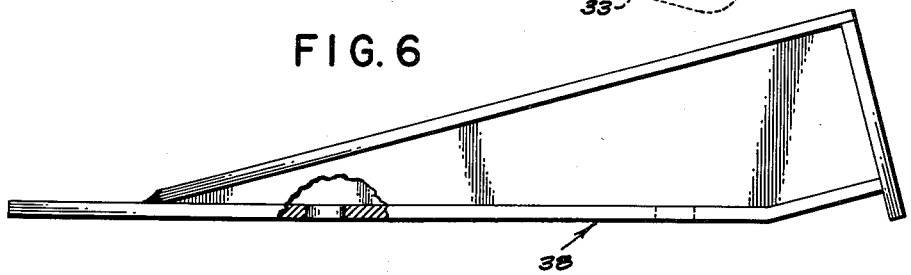
FIG. 6 is an enlarged-scale side elevational view, partly broken away and in section, of one of two levelling wedges removably associated with the body.
Figure 7:
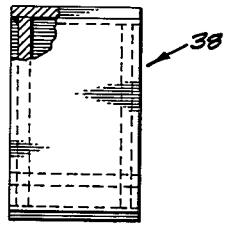
FIG. 7 is an end elevational view of the wedge.

A plurality of holes 35, see FIG. 8, are drilled through said frame extensions, and two sets of holes 36 are drilled through the skirts in positions whereat one of said sets registers with the holes 35 when the ramp occupies the lowered position shown by full lines in FIG. 1 and the other set registers with said holes 35 when the ramp occupies the raised position in which it is shown in FIGS. 4, 5 and 8. Bolts 37 are applied through said registering holes to lock the ramp in a selected said position. Wedges 38 are removably inserted adjacent each side of the ramp between a tail prolongation 40 of the main frame and longitudinal box members 41 integral with the ramp. By supporting said ramp in the latter's raised position the wedges relieve the bolts of shear loading. Upstanding dowels 42 welded to said frame prolongations 40 fit in registering holes of the wedges to localize the wedges. In the lowered position of the ramp said box members bear upon the frame prolongations 40, having holes in their bottom walls to accommodate said dowels.

To facilitate loading and unloading of the vehicle's flat bed a roller 39 is provided at the rear end of the ramp, being suitably journaled thereto for rotation about a transverse horizontal axis.

For raising and lowering said fifth wheel and the ramp in concert so that the one will rise while the other drops, the invention provides at the substantial center of the vehicle, transversely speaking, a double-duty lever fulcrumed intermediate its ends to the vehicle frame for rocker movement about a transverse horizontal axis located in the general transverse vertical plane occupied by the hinge about which the ramp swings. The fulcrum pin is designated by 43. The forwardly extending arm 44 of the lever has a roller 45 journal-mounted upon its free end, and this roller bears upon the underside of the plate 18. The rearwardly extending arm 46 of the lever has a roller 47 journal-mounted upon its free end. Such latter roller bears upon the underside of a horizontal plate 48 integral with the ramp. An air cylinder 50 is hung from the underside of the vehicle frame and has its piston rod 51 attached by a wrist connection 52 to the lever at a point thereon outwardly spaced from the fulcrum. As is indicated in phantom in FIG. 1, the ramp admits of being raised above its load-carrying position, namely above a position flush with the main deck of the flat bed, in order to enable the removable wedges to be fitted over the dowels.

It is believed that the invention will have been clearly understood from the foregoing detailed description of my now preferred illustrated embodiments. Changes in the details of construction will suggest themselves and it is accordingly my intention that no limitations be implied and that the hereto annexed claims be given the broadest interpretation to which the employed language fairly admits.

What I claim is:

1. A tractor truck having a flat bed body with a well therein, a fifth wheel mounted in said well for vertical motion from a lowered inoperative position to a raised operating position elevated above the flat bed, and a tail ramp hinged to the rear end of said flat bed body for swing motion about a transverse horizontal axis between a raised position flush with the flat bed and a lowered position inclined downwardly from said bed, said fifth wheel presenting a socket for a trailer-carried king pin and having a longitudinal slot open at the rear leading forwardly to said socket, the tail ramp being formed centrally of its width with a depressed trough, said trough, when the fifth wheel is raised and the ramp lowered, registering with said rear opening of the fifth wheel's longitudinal slot and serving as a lead-in throat to guide the king pin into said slot, the side walls of said trough converging toward the front.

2. A tractor truck having a flat bed body with a well therein, a fifth wheel having a flat top plate and mounted in said well for vertical motion from an inoperative lowered position whereat the flat plate lies flush with the flat bed into an operating raised position whereat the plate is elevated above said bed, a tail ramp hinged to the rear end of said flat bed body for swing motion about a transverse horizontal axis between a raised position flush with the flat bed and a lowered position inclined downwardly from said bed, the fifth wheel and the ramp being so formed and positioned that when the former is raised and the latter lowered the ramp directs a trailer-carried complement of said fifth wheel into functioning engagement with the fifth wheel, and means for moving said fifth wheel and the ramp so that either the fifth wheel is placed in its raised position and the ramp placed in its lowered position or the fifth wheel placed in its lowered position and the ramp placed in its raised position.

3. A tractor truck having a flat bed body with a well therein, a fifth wheel having a flat top plate and mounted in said well for vertical motion from an inoperative lowered position whereat the flat plate lies flush with the flat bed into an operating raised position whereat the plate is elevated above said bed, and a tail ramp hinged to the rear end of said flat bed body for swing motion about a transverse horizontal axis between a raised position flush with the flat bed and a lowered position inclined downwardly from said bed, the fifth wheel and the ramp being so formed and positioned that when the former is raised and the latter lowered the ramp directs a trailer-carrier complement of said fifth wheel into functioning engagement with the fifth wheel, power-driven means being provided for moving said fifth wheel and the ramp in concert, the one raising while the other lowers.

4. A tractor truck having a flat bed body with a well therein, a fifth wheel having a flat top plate, a frame to which said fifth wheel is connected pivotally mounted within said well from the body of the truck for vertical swing motion about a transverse horizontal axis moving said fifth wheel from an inoperative lowered position whereat the top plate lies flush with the flat bed into an operative raised position exposing said plate above the flat bed, and a tail ramp hinged to the rear end of said flat bed body for swing motion about a transverse horizontal axis between a raised position flush with the flat bed and a lowered position inclined downwardly from said bed, the fifth wheel and the ramp being so formed and positioned that when the former is raised and the latter lowered the ramp directs a trailer-carried complement of said fifth wheel into functioning engagement with the fifth wheel.

5. Structure according to claim 2 wherein means are provided for releasably locking said ramp in either its raised or its lowered position.

6. Structure according to claim 4 having means for releasably locking the frame at the upper extreme of its said swing motion.

7. Structure according to claim 4, removable inserts being provided to occupy positions between the ramp and a rear extension of the truck frame when the ramp is raised so as to pass the load of said ramp directly into said truck frame.

8. A tractor truck as recited in claim 7 having means for releasably locking said inserts in place.

9. The tractor truck recited in claim 4 in which said ramp rests directly upon rear extensions of the truck frame when occupying its lowered position, and having removable wedges insertable between the ramp and said rear extensions when the ramp occupies its raised position.

10. The tractor truck of claim 9 in which said wedges are localized with respect to the truck by fitting over upstanding dowels made integral with said rear extensions, releasable lock means being provided for holding said ramp in either its raised or its lowered position.

11. Structure according to claim 4, the body of the truck providing rigid means on which the free end of said hinged frame rests when the frame is moved to its lowered position.

12. Structure according to claim 3, the power-driven means including a lever extending longitudinally of the truck and pivoted therefrom intermediate its ends for rocker movement about a transverse horizontal axis, the two ends of said lever having operative connection one with the fifth wheel and the other with the ramp and by upward swing motion acting in the instance of the former end to responsively raise the fifth wheel and in the instance of the latter end to responsively raise the ramp.

References Cited in the file of this patent

UNITED STATES PATENTS

| | | |
|---|---|---|
| 1,568,168 | Land | Jan. 5, 1926 |
| 1,883,473 | Barrett | Oct. 18, 1932 |
| 2,515,575 | Van Langen | July 18, 1950 |
| 2,587,265 | Wright | Feb. 26, 1952 |
| 2,676,033 | Housh et al. | Apr. 20, 1954 |
| 2,730,376 | Martin | Jan. 10, 1956 |
| 2,925,286 | Hodges et al. | Feb. 16, 1962 |
| 3,051,340 | Ely | Aug. 28, 1962 |
| 3,073,624 | Thomas | Jan. 15, 1963 |

FOREIGN PATENTS

| | | |
|---|---|---|
| 1,235,509 | France | May 30, 1960 |